United States Patent
Mackel et al.

(10) Patent No.: US 9,186,686 B2
(45) Date of Patent: Nov. 17, 2015

(54) CENTRIFUGE HAVING A LUBRICANT SYSTEM THAT DELIVERS LUBRICANT IN TEMPORALLY DISCRETE PULSES

(75) Inventors: Wilfried Mackel, Lippetal (DE); Marie-Theres Sedler, Wadersloh (DE); Thomas Bathelt, Oelde (DE); Thomas Kleimann, Oelde (DE); Andreas Penkl, Lippetal (DE); Bernd Terwey, Coesfled (DE)

(73) Assignee: GEA Mechanical Equiptment GmbH, Oelde (DE)

( * ) Notice: Subject to any disclaimer, the term of this patent is extended or adjusted under 35 U.S.C. 154(b) by 890 days.

(21) Appl. No.: 13/321,643

(22) PCT Filed: May 28, 2010

(86) PCT No.: PCT/EP2010/057448
§ 371 (c)(1),
(2), (4) Date: Nov. 21, 2011

(87) PCT Pub. No.: WO2010/136579
PCT Pub. Date: Dec. 2, 2010

(65) Prior Publication Data
US 2012/0071313 A1    Mar. 22, 2012

(30) Foreign Application Priority Data
May 28, 2009 (DE) .......................... 10 2009 022 972

(51) Int. Cl.
*B04B 9/12* (2006.01)
*B04B 9/04* (2006.01)

(52) U.S. Cl.
CPC .... *B04B 9/04* (2013.01); *B04B 9/12* (2013.01)

(58) Field of Classification Search
CPC .................................... B04B 9/12; B04B 9/04
USPC .................. 494/1, 12, 16, 20, 82–84, 14–15,
494/60–61; 68/23.1, 23.3; 464/180;
210/144, 363; 74/572, 574; 384/465,
384/473, 468; 184/6.18, 6.26
See application file for complete search history.

(56) References Cited

U.S. PATENT DOCUMENTS 1,551,140 A * 8/1925 Edstrom ........................ 451/277
1,745,853 A * 2/1930 Krantz ........................... 384/368
(Continued)

FOREIGN PATENT DOCUMENTS

DE       1 014 349       8/1957
DE       1 057 979       5/1959
(Continued)

*Primary Examiner* — Charles Cooley
(74) *Attorney, Agent, or Firm* — Crowell & Moring LLP

(57) ABSTRACT

Disclosed is a centrifuge including a rotatable centrifugal drum and a drive spindle to drive the centrifugal drum. The drive spindle is rotatably mounted via a bearing in a housing supported elastically on a machine framework. Further included is a drive device including a drive motor to rotate the drive spindle and a lubricant system to lubricate the bearing. The lubricant system is configured to deliver lubricant from a lubricant supply tank through a lubricant channel into a region of the bearing. An injection device is arranged downstream of the lubricant-supply tank and is configured to deliver the lubricant into the region of the bearing by dispensing quantities of lubricant in temporally discrete pulses with a limited-time air stream. A method is disclosed of directing lubricant into a region of a bearing of the centrifuge as noted above.

12 Claims, 6 Drawing Sheets

(56) References Cited

U.S. PATENT DOCUMENTS

| | | | |
|---|---|---|---|
| 2,398,944 A * | 4/1946 | Kopetz | 184/6 |
| 2,534,738 A * | 12/1950 | Scott | 384/196 |
| 2,597,405 A * | 5/1952 | Tholl | 384/465 |
| 3,257,235 A * | 6/1966 | Steele et al. | 127/19 |
| 3,318,644 A * | 5/1967 | Johnson, III | 384/415 |
| 4,205,708 A * | 6/1980 | Burgbacher | 139/1 R |
| 4,700,808 A * | 10/1987 | Haentjens | 184/6.18 |
| 5,020,636 A * | 6/1991 | Daeges | 184/6.26 |
| 5,725,071 A * | 3/1998 | Brice | 184/6.26 |
| 5,848,959 A * | 12/1998 | Droste et al. | 494/15 |
| 6,117,063 A * | 9/2000 | Szepessy et al. | 494/14 |
| 6,228,016 B1 * | 5/2001 | Kristensen et al. | 494/14 |
| 6,267,204 B1 * | 7/2001 | Kristensen et al. | 184/6.16 |
| 6,578,670 B1 * | 6/2003 | Klintenstedt et al. | 184/6.16 |
| 6,988,980 B2 * | 1/2006 | Moss | 494/15 |
| 7,090,634 B2 * | 8/2006 | Mackel et al. | 494/15 |
| 7,588,526 B2 * | 9/2009 | Kleimann et al. | 494/15 |
| 8,425,394 B2 * | 4/2013 | Skytt et al. | 494/15 |
| 8,758,209 B2 * | 6/2014 | Mackel et al. | 494/15 |
| 8,845,505 B2 * | 9/2014 | Mackel et al. | 494/15 |
| 2004/0192532 A1 * | 9/2004 | Mackel et al. | 494/15 |
| 2005/0065010 A1 * | 3/2005 | Moss | 494/15 |
| 2009/0111676 A1 * | 4/2009 | Kleimann et al. | 494/46 |
| 2010/0255976 A1 * | 10/2010 | Mackel et al. | 494/15 |
| 2012/0071313 A1 * | 3/2012 | Mackel et al. | 494/11 |
| 2015/0051059 A1 * | 2/2015 | Mackel et al. | 494/14 |

FOREIGN PATENT DOCUMENTS

| | | | | |
|---|---|---|---|---|
| DE | 1 809 082 | | 11/1968 | |
| DE | 38 38 786 | | 8/1989 | |
| DE | 43 14 440 | | 6/1994 | |
| DE | 44 08 182 | | 5/1995 | |
| DE | 20 2005 001 539 | | 7/2006 | |
| EP | 215585 | A1 * | 3/1987 | B04B 11/04 |
| EP | 0 266 765 | | 5/1988 | |
| EP | 311791 | A2 * | 4/1989 | B04B 9/12 |
| EP | 0 756 879 | | 2/1997 | |
| EP | 0 756 897 | | 2/1997 | |
| EP | 1 462 178 | | 9/2004 | |
| FR | 1 287 551 | | 3/1962 | |
| FR | 1 287 551 | | 1/1969 | |
| GB | 799 484 | | 10/1956 | |
| WO | 98/57752 | | 12/1998 | |
| WO | 03/080250 | | 10/2003 | |
| WO | 2007/125066 | | 11/2007 | |

* cited by examiner

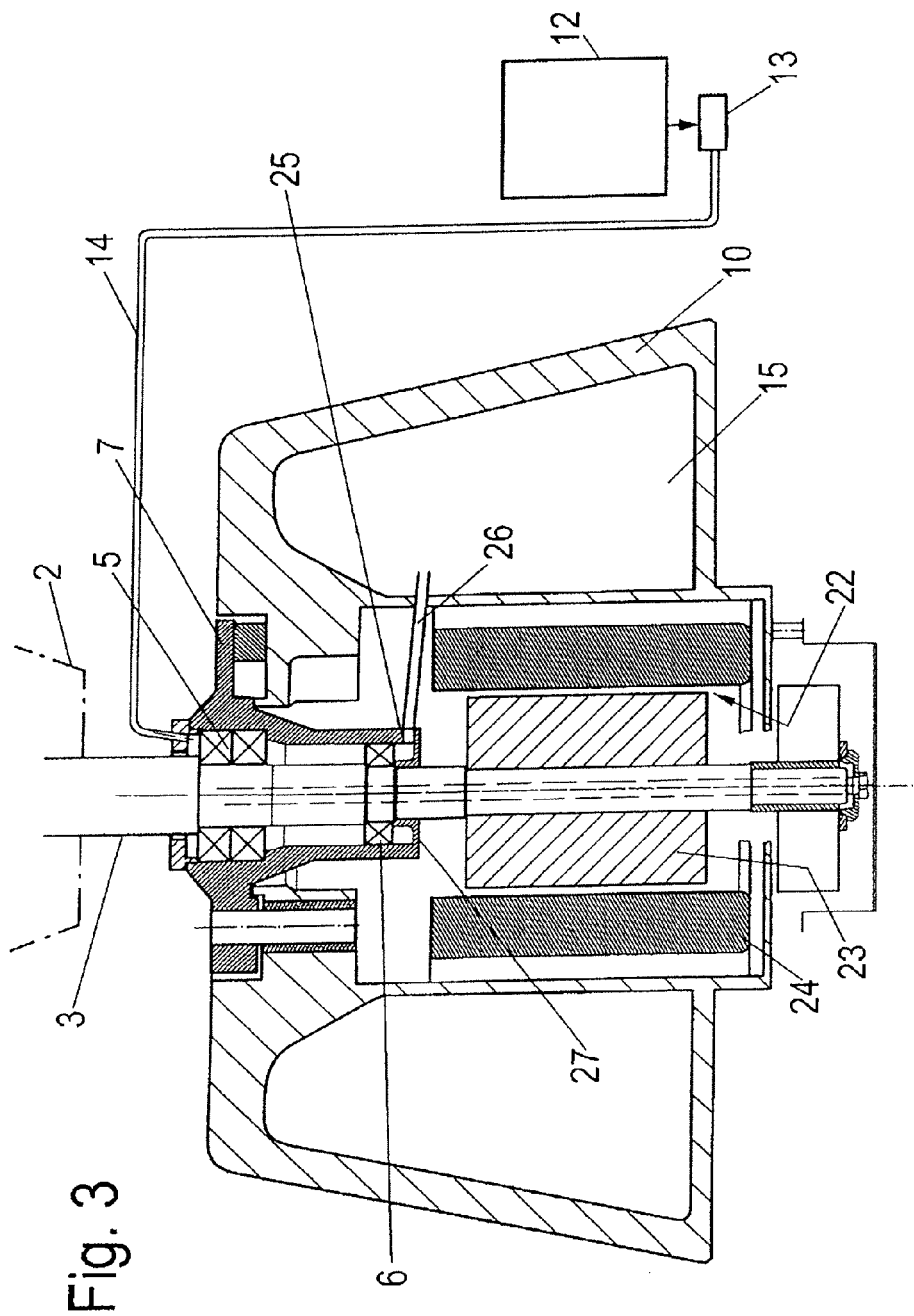

ial use in continuous operation,
CENTRIFUGE HAVING A LUBRICANT SYSTEM THAT DELIVERS LUBRICANT IN TEMPORALLY DISCRETE PULSES This application is a national stage of International Application PCT/EP2010/057448, filed May 28, 2010, and claims benefit of and priority to German Patent Application No. 10 2009 022 972.8, filed May 28, 2009, the content of which Applications are incorporated by reference herein.

BACKGROUND AND SUMMARY

The present disclosure relates to a centrifuge, or a separator, with a vertical axis of rotation. The centrifuge includes a rotatable centrifugal drum and a drive spindle to drive the centrifugal drum. The drive spindle is rotatably mounted via a bearing in a housing supported elastically on a machine framework. Further included is a drive device including a drive motor to rotate the drive spindle and a lubricant system to lubricate the bearing. The lubricant system is configured to deliver lubricant from a lubricant supply tank through a lubricant channel into a region of the bearing.

Such centrifuges, in particular separators, which are suitable in particular for industrial use in continuous operation, are known from the prior art. The known systems include designs in which the drum, the drive spindle and the electric drive motor are connected rigidly to form a structural unit which then, as a whole, is supported elastically on a machine framework. Examples of such prior art are disclosed in FR 1,287,551, DE-B 1 057 979 and DE 43 14 440 C1.

Additional technical background is provided by DE 44 08 182, which discloses a belt drive for a separator, and EP 0 756 897 and WO 98/57752.

DE 2005 001 539 U1 discloses a separator which has a drive belt and also has a circuit-like lubrication system, which is intended for lubricating the spindle-bearing means. The separator has a tubular, scraper-like device which is intended for pumping out lubricant. Such lubricant, which exits out of the bearing means of the drive spindle of the separator drive, can be pumped, via a reprocessing unit, into a lubricant sump, in which the drive spindle, designed as a hollow spindle, is immersed by way of its lower end. This arrangement, however, is still relatively long in the axial direction.

WO 2007/125066 A1 discloses a separator with a direct drive. The direct drive device has an electric drive motor with a stator and a motor rotor, which is aligned with the drive spindle, wherein the stator is connected rigidly to the machine framework and the motor rotor, the drive spindle, the centrifugal drum and the housing form a unit which is supported elastically on the machine framework and oscillates during operation. The bearing device here is arranged between the motor and the drum. The lubrication means of the bearing devices can be accommodated above a partition wall above the drive motor.

Against this background, the present disclosure relates to a further improvement of the construction and the arrangement of the lubrication system of centrifuges, in particular separators with a vertical axis of rotation.

The present disclosure thus relates to a centrifuge that includes a rotatable centrifugal drum and a drive spindle to drive the centrifugal drum. The drive spindle is rotatably mounted via a bearing in a housing supported elastically on a machine framework. Further included is a drive device including a drive motor to rotate the drive spindle and a lubricant system to lubricate the bearing. The lubricant system is configured to deliver lubricant from a lubricant supply tank through a lubricant channel into a region of the bearing.

Also included is an injection device, arranged downstream of the lubricant-supply tank, and configured to deliver the lubricant into the region of the bearing by dispensing quantities of lubricant in temporally discrete pulses with a limited-time air stream.

Accordingly, at least one injection device, which is arranged downstream of the lubricant-supply tank, is provided for the purpose of delivering the lubricant. This device is designed for dispensing quantities, for example, small quantities of lubricant in temporally discrete pulses, with a limited-time air stream, into the region of the bearing. This makes it possible for the lubricant requirement to be vastly reduced, for example, when the pulse of oil is blown as a mist into the region of the bearing.

The injection device may be designed as an injection lubricator. Such injection lubricators may have a piston. According to an embodiment of the present disclosure, small quantities of lubricant are thereby dispensed in the separator, at intervals, into the bearing region, for example, at less than 100 mm$^3$ per pulse.

The use of injection lubricators in the field of lubricating a bearing for a centrifuge has not been considered up until now. However, contrary to original expectation, it has been found that it is possible, using such an injection lubricator, for even a separator intended for industrial use to be lubricated adequately with only a very small amount of lubricant without continuous operation being adversely affected.

Using an injection lubricator thus makes it possible for the consumption of lubricant to be reduced to an extremely small quantity, for example, to less than 30 liters per year of operation occurring, for example, over 8000 hours.

It is within the scope of the present disclosure for the injection lubricator to be designed to dispense a quantity of lubricant by a micropump for up to two seconds long, for example, such that, between the individual pulses, there is a pause of more than 60 seconds, and that each pulse is up to two seconds long, for example, one second long.

The injection lubricator may be advantageously designed in order to dispense a quantity of lubricant by a piston for up to two seconds long per pulse, wherein the injection lubricator, furthermore, may be set such that, between the individual pulses, there is a pause of more than 60 seconds, for example, 60 seconds to 180 seconds.

According to the present disclosure, the injection lubricator, may advantageously be designed in order to dispense a quantity of lubricant of between 5 mm$^3$ and 100 mm$^3$, for example, between 10 mm$^3$ and 40 mm$^3$, by a piston, for example, every 60 seconds to 180 seconds.

A lubricant supply which uses up only a particularly small amount of lubricant is realized with only a small number of components. The design, according to the present disclosure, is suitable both for driving via a belt drive and for various types of direct drive with a drive motor arranged in axial extension of the drive spindle or on the drive spindle. These arrangements also make it possible, according to the present disclosure, to realize a construction for the drive device which is short in the vertical direction.

It should be noted that the centrifuge, according to the present disclosure, may also be designed as a solid-bowl centrifuge.

If the centrifuge is designed as a solid-bowl centrifuge, which may have bearings, for example, on either side of a rotatable drum, and, for example, at least one such bearing, each mounted in a ring-like housing, it may be advantageous, according to the present disclosure, if lubricant can be delivered, by at least one injection device, out of the lubricant-supply tank into the region of one or both of the bearings.

Also provided, according to the present disclosure, is a method for directing lubricant into the region of at least one bearing of a centrifuge, according to the present disclosure, in an advantageous and lubricant-saving manner. A respective oil/air mixture is injected in pulses, by at least one injection lubricator, into the region of the at least one bearing.

Additional disclosure, according to the present disclosure, is provided in the claims.

Since the spindle may not used for the lubricant circuit, the spindle can be used for other tasks such as product feeding, for example, through a hollow spindle, according to the present disclosure.

Other aspects of the present disclosure will become apparent from the following descriptions when considered in conjunction with the accompanying drawings.

BRIEF DESCRIPTION OF THE DRAWINGS

FIGS. 1 to 3 show partial sectional views of schematically illustrated drives for separators, or solid-bowl centrifuges, according to the present disclosure.

DETAILED DESCRIPTION

Figure 1:
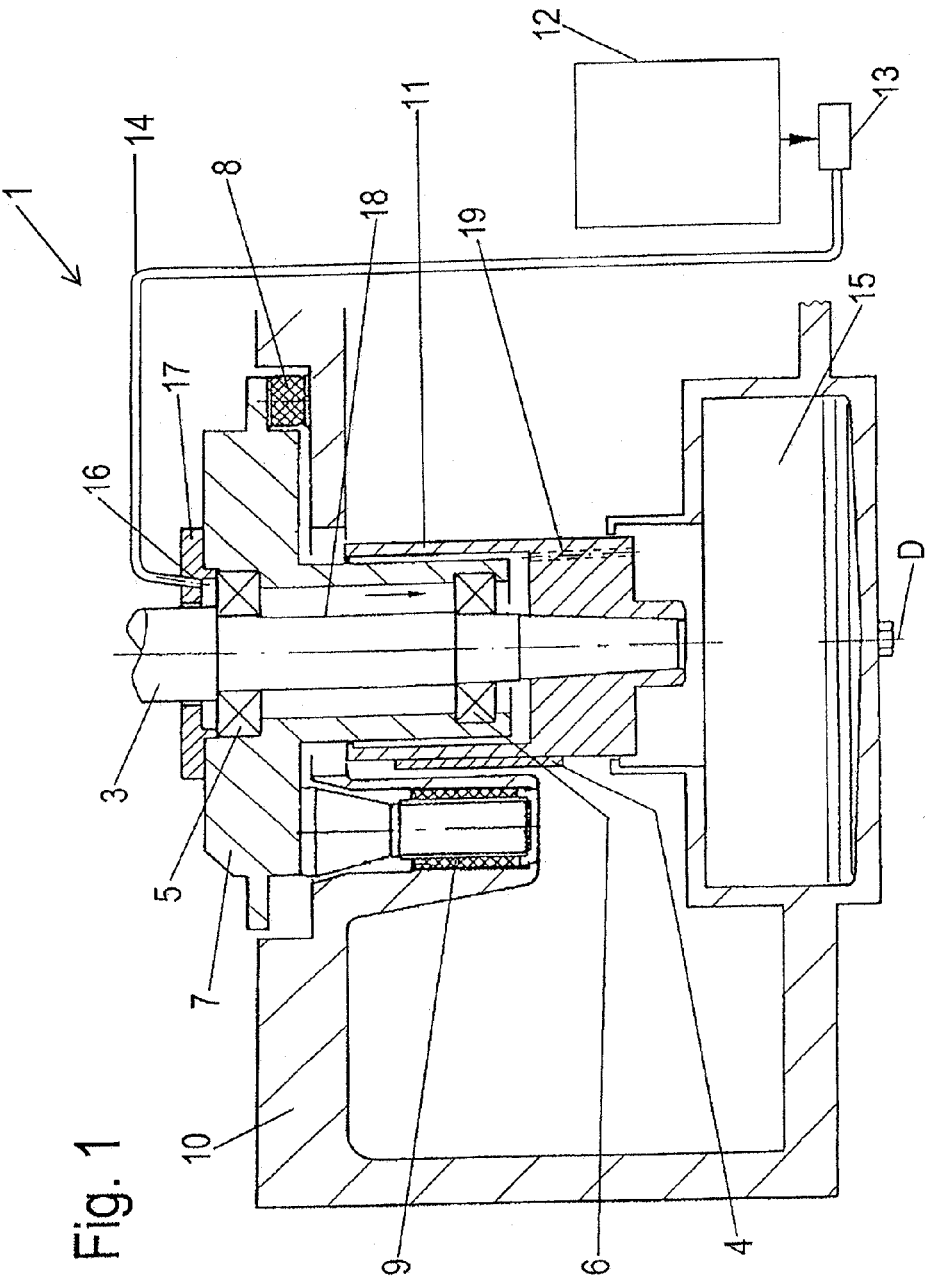

FIG. 1 shows a sub-region of a separator 1 having a centrifugal drum 2 (see FIG. 3) with a vertical axis of rotation D and a supply line (not shown) for material which is to be centrifuged.

The centrifugal drum 2 is positioned on a drive spindle 3. A shroud and a solids trap are not shown.

As shown in FIG. 1, the drive spindle 3 is driven via a drive belt 4, which wraps around a belt pulley 11, which is in one or more parts and is positioned on the drive spindle 3. A driveshaft and a drive motor are not shown in FIG. 1.

The drive spindle 3 is mounted in a rotatable manner in a housing 7 by way of a bearing, for example, a neck bearing 5, or upper bearing, and a foot bearing 6, or lower bearing. By way of example, the neck bearing 5 and the foot bearing 6 have a single rolling-contact bearing. Other configurations, for example with two neck bearings or foot bearings are within the scope of the present disclosure but not shown.

The housing 7 is supported by one or more elastic elements 8, 9, for example, by cylindrical bearings and/or ultra bushings or equivalent bearings, on a machine-framework portion 10. Machine framework portion 10 may be designed as part of a primary machine framework or may be fastened on a ceiling of a building or the like, according to the present disclosure.

The illustration of the housing 7, for example, having a flange is to be understood to be an example. The critical factor is for the housing 7 to be supported elastically on the machine framework 10 during operation, it being designed to be rotationally fixed during operation. It accommodates the bearings 5, 6, in which the drive spindle 3 rotates.

For the purpose of supplying the bearings of the drive spindle with lubricant, use is made of a lubricant system which has a lubricant-supply tank 12 and at least one injection device 13, which is positioned downstream of the lubricant-supply tank 12 and is intended for dispensing quantities, for example, small quantities of lubricant in temporally discrete pulses with a limited-time air stream. Accordingly, rather than a permanent air stream, use is made of an air-stream pulse, to which the quantity of lubricant is fed.

Also provided are a lubricant-feed line 14, which is arranged downstream of the injection device 13 and is for directing lubricant from the injection device 13 into the region of the bearings, for example, the bearings 5, 6, and a lubricant-intercepting tank 15 for intercepting quantities of residual oil dripping off from the region of the bearings.

The feed line 14, which is positioned downstream of the injection device 13, may be designed as a pressurized oil line, according to the present disclosure.

The lubricant-feed line 14 may extend into the region of the neck bearing 5, for example, into the region above the neck bearing 5.

It is within the scope of the present disclosure, that just one injection device is provided. However, it is within the scope of the present disclosure for one or more injection devices to supply individual bearing locations, or all of the bearing locations provided individually. For such a purpose, it is then expedient to route a respective lubricant-feed line 14 to each of these bearing locations and possibly a corresponding discharge line (not shown) from each of these locations. It is within the scope of the present disclosure, also for each bearing location or each of the bearings to be fed advantageously an individually optimized quantity of lubricant.

The line 14 passes through a bore 16 in a housing part 17 connected to the housing 7.

Lubricant exiting from an open end of the bore thus may spray in a mist-like manner from above into the bearing, or bearing 5, 6, of the drive spindle 3.

As suggested in FIG. 1, the lubricant flows in the first instance through the neck bearing 5, from there through a discharge channel 18, for example, an annular chamber on the outer circumference of the drive spindle 3, into and through the foot bearing 6 and then through a discharge channel 19 in the belt pulley 11. Flow may continue through further elements not shown.

The belt pulley 11 may be in the form of a cup which is closed at the bottom. In the base region, it is connected in a rotationally fixed manner to the drive spindle 3. The drive belt 4 is positioned around its outer lateral surface. The belt pulley 11 is closed in the downward direction apart from the discharge channel 19, such that all the lubricant exiting vertically downwards from the bearings 5, 6 is directed outward, through the discharge channel 19, out of the belt pulley 11 or the belt-pulley arrangement.

A lower end of the belt pulley 11 or of the further elements noted above projects into the lubricant-intercepting tank 15, and therefore lubricant 20 dripping off from the drive region is intercepted, and collected, in the lubricant-intercepting tank 15.

The injection device 13 used may be an injection lubricator for the purpose of metering small quantities of lubricant.

The used oil collects in the lubricant-intercepting tank 15.

Thus, according to the present disclosure, a residual quantity of lubricant has to be disposed of during operation only extremely rarely.

Figure 2:
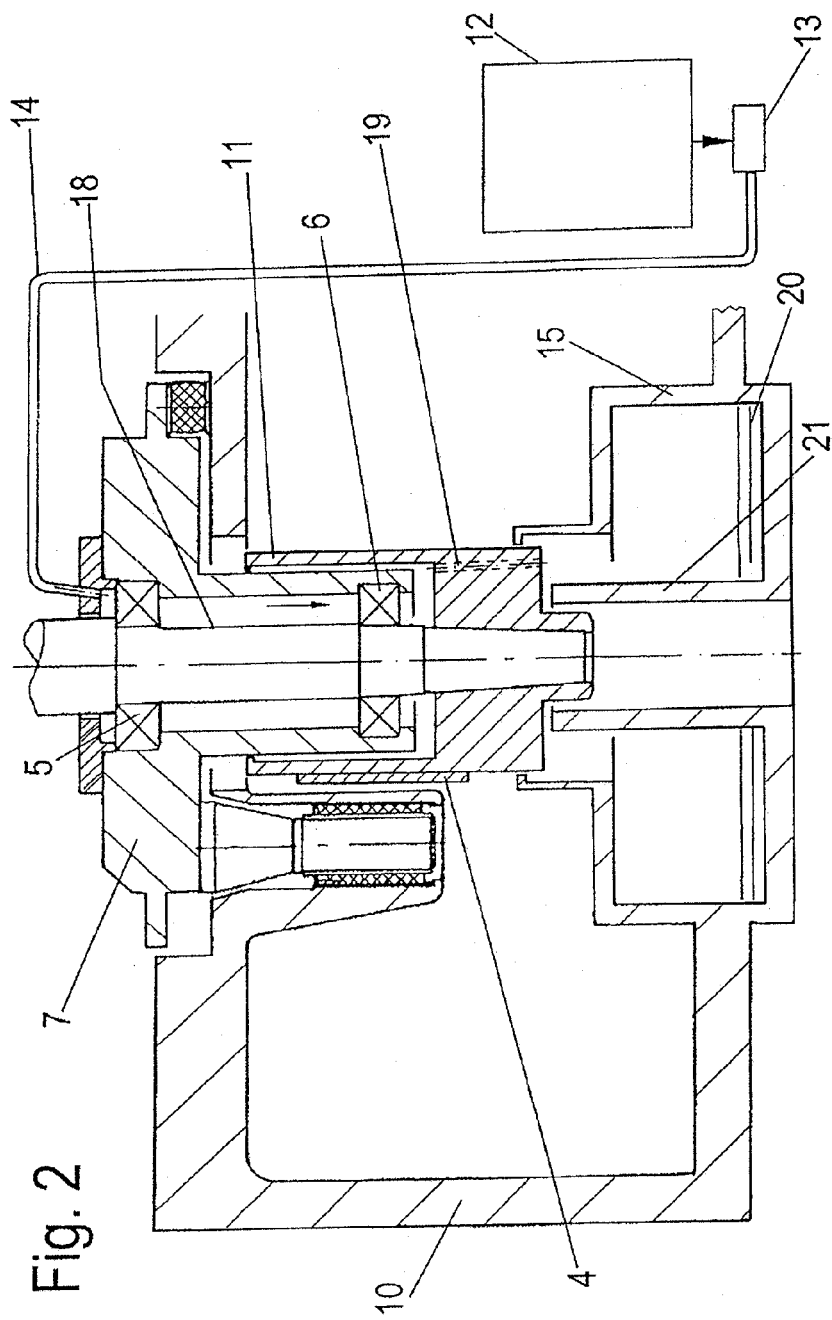

As shown in FIG. 2, a lower, free end of the drive spindle 3 is immersed in a tube portion 21 in the lubricant-intercepting tank 15. This tube portion 21 is open in the upward and downward directions and passing through the tank vertically. Therefore, it is within the scope of the present disclosure for the drive spindle 3 to be a hollow spindle in order for product to be directed through it into the centrifugal drum 2 (not shown).

As shown in FIG. 3, the drive provided for the separator, may be a direct drive.

In such a case, an electric drive motor 22 is aligned directly with the drive spindle 3.

As shown in FIG. 3, for example, the motor rotor 23 is arranged directly on the drive spindle 3 and the stator 24 of the drive motor 22 is arranged on the non-rotating machine framework 10.

The bearings 5, 6 and the lubricant system correspond in respect of the operation of directing the lubricant into the region of the bearings 5, 6, to the construction as shown in FIGS. 1 and 2.

The lubricant exiting from the foot bearing 6 is directed away through a discharge channel 25, which passes through the housing 7. The discharge channel 25 is aligned with a line 26 which, in turn, opens out into the lubricant-intercepting tank 15, which is integrated in the machine framework 10. The lubricant-intercepting tank 15 is formed to the side of the drive motor 22. The tank 15 may also enclose the same in the manner of an annular tank. The line 26 may be of flexible design, to allow it to move along with the housing 7.

The region between the drive spindle 3 and the housing 7 may be sealed, for example, by a glide ring seal 27, in order to prevent lubricant from being able to drip into the region of the drive motor 22. As an alternative, it is within the scope of the present disclosure to seal the region between the drive spindle 3 and the intercepting chamber or lubricant-intercepting tank 15.

The lubricant-intercepting tanks 15 may be provided with a closable outlet opening, in order for it to be possible to let out possibly old lubricant residues.

It is within the scope of the present disclosure for the lubricant-supply tank 12 and/or lubricant-intercepting tank 15 to be integrated at various locations in the machine framework 10 or for separate tanks to be arranged for their respective purposes on the machine framework 10.

Whereas the discharge channel 25, as shown in FIG. 3, is arranged beneath the foot bearing 6, it within the scope of the present disclosure for it to be arranged between the foot bearing 6 and the neck bearing 5. The embodiment shown may be preferred since it provides for all the lubricant residues to be directed away out of the bearing region to good effect.

The centrifuge according to the present disclosure may be designed as a solid-bowl centrifuge.

Figure 5:
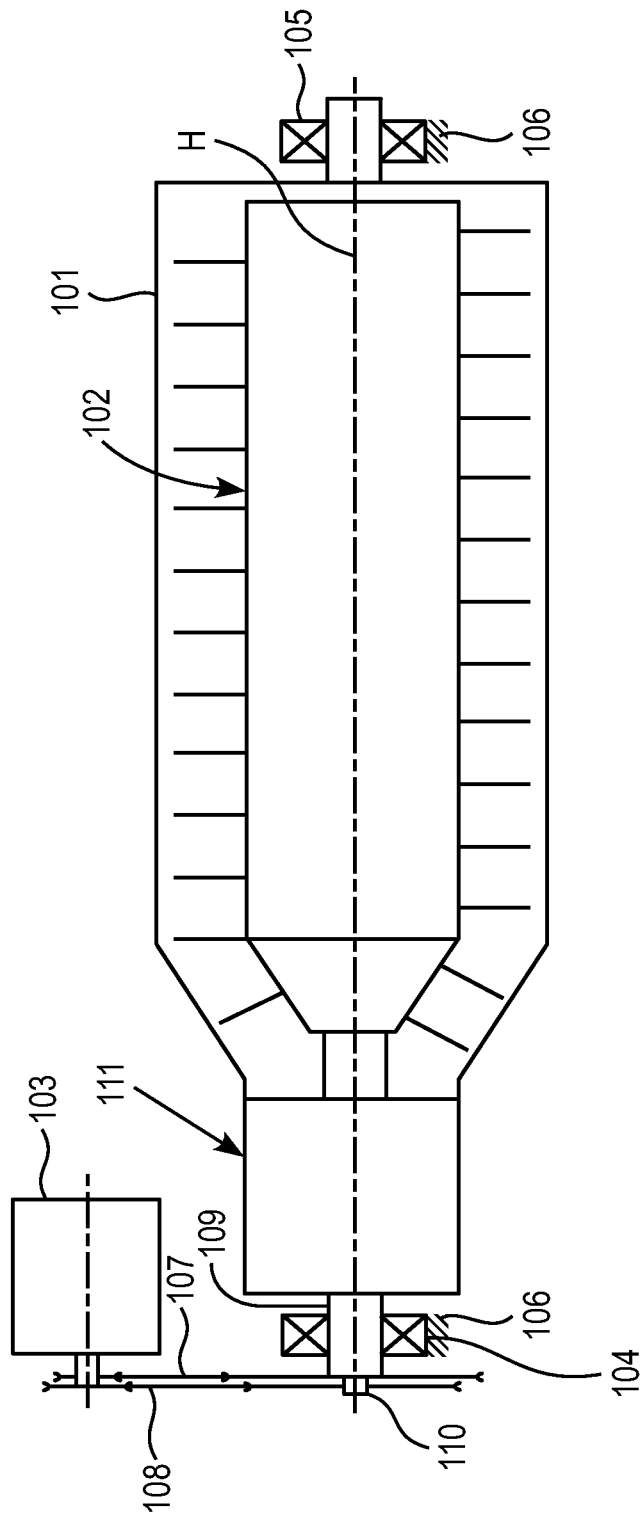
FIG. 5 shows a schematic, partial sectional view of a solid-bowl centrifuge, according to the present disclosure.

FIG. 5 shows a solid-bowl centrifuge, or decanter, having a rotatable drum 101 with, for example, a horizontal axis of rotation H. Also shown is a rotatable screw 102, arranged within the drum 101, and with a drive motor 103 for rotating the drum 101 and the screw 102.

The drum 101 of FIG. 5 is arranged between a drum bearing 104, on the drive side, and a drum bearing 105, remote from the drive side. The drum 101 is rotated in a rotatable manner, by way of drum bearings 104, 105, on a machine framework/base 106.

For driving purposes, drive motor 103 uses belt drives 107, 108 to drive transmission input shafts 109, 110, corresponding to the one or more drive spindles, by which the screw 102 and the drum 101 are rotated via one or more transmission arrangements 111. Other drive arrangements are within the scope of the present disclosure. A product inflow and corresponding outflows for at least one liquid phase and a solid phase are not shown. These elements, however, are known to a person skilled in the art.

The lubricant system for lubricating the bearings 104, 105 is arranged on the machine framework 106 in a manner similar to FIG. 1 but not shown here. The system is designed in order to deliver lubricant out of a lubricant-supply tank. The lubricant-supply tank may be integrated in the machine framework 106. The system has at least one injection device, which is arranged downstream of the lubricant-supply tank and is designed for dispensing quantities, for example, small quantities of lubricant in temporally discrete pulses, with a limited-time air stream, into the region of the bearings 104, 105.

Figure 4A:
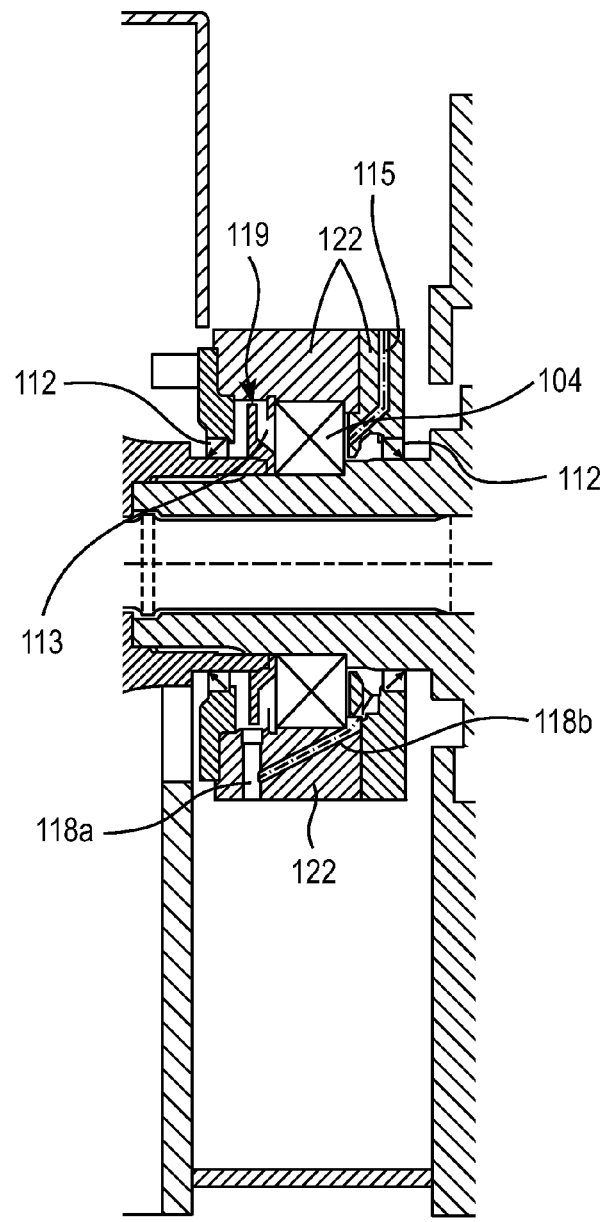
FIGS. 4a and b show sectional views of bearing regions of a solid-bowl centrifuge, according to the present disclosure.
Figure 4B:
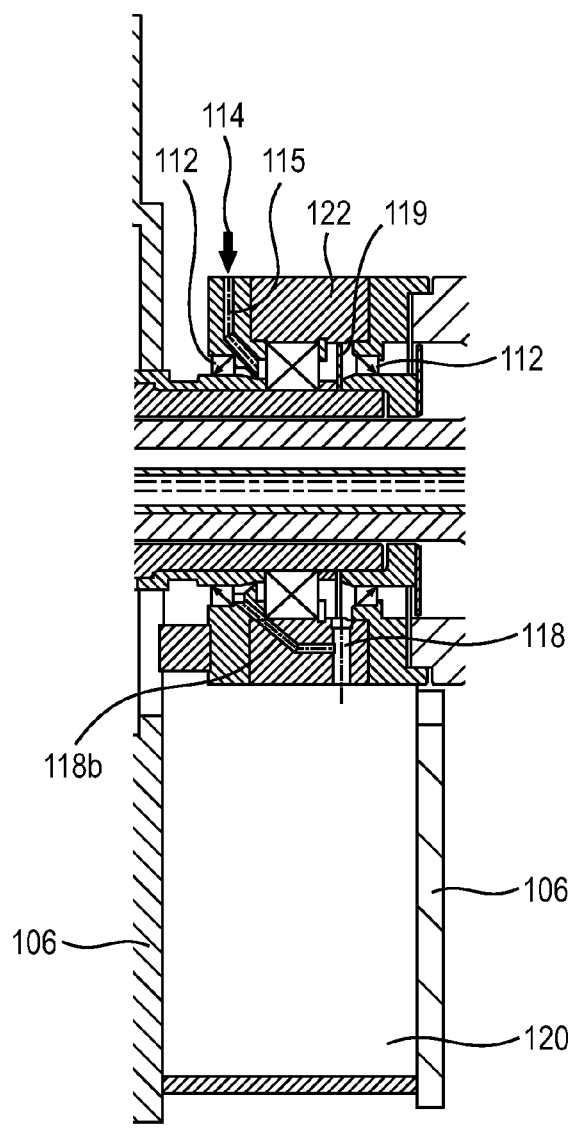

The at least one injection device has positioned downstream of it a lubricant-feed line 114, shown as an arrow, which has a bore 115 in a housing 112 of the bearings 104, 105 (see FIGS. 4b and 5), and by which bore 115 the lubricant can be delivered into the region of one or both of the bearings 104, 105. That delivery may be above the bearings 104, 105 or to the side of the bearings 104, 105 on the horizontal spindle.

Just one injection device may be provided. However, it is within the scope of the present disclosure for one or more injection devices to be provided and for them to supply individual bearing locations, or all of the bearing locations 104, 105 individually. It may be expedient to route a respective lubricant-feed line 114 to each of these bearing locations 104, 105 and possibly a corresponding discharge line (not shown) from each of these locations. It is within the scope of the present location for each bearing location 104, 105 or each of the bearings 104, 105 to be fed, advantageously, an individually optimized quantity of lubricant.

According to the present disclosure, lubricant may be injected in a mist-like manner from above into the bearings 104, 105.

The lubricant thus flows through the respective bearings 104, 105 to vertically lower regions of the bearings 104, 105 and from there, through at least one discharge channel, or two discharge channels 118a, 118b, beneath and what may also be on one side, or on either side, of the respective rolling-contact bearings 104, 105, into a lubricant-intercepting tank 120 (see FIG. 4b) beneath the respective bearings 104, 105, and may be integrated in the machine framework 106.

As described herein in relation to the separator, oil is injected into an air stream through the bore 115. In embodiments of the present disclosure, the bore 115 may have a constriction, and therefore, for example, upstream of the exit, a nozzle is formed. The nozzle has a diameter which is smaller than that of the bore 115, for example, by 0.1 to 0.5 mm.

It may be advantageous, according to the present disclosure, for the bores 115 to have a diameter of 0.3 mm to 5 mm. The a diameter may be 0.5 mm to 1.2 mm, or, for example, 0.8 to 1.2 mm, in order reliably to feed 1-100 mm$^3$ per pulse, or, for example, 3-20 mm$^3$ per pulse, of lubricant.

In accordance with the present disclosure, more than 10 seconds, or, for example, more than 60 seconds, may elapse between the pulses.

It is within the scope of the present disclosure to have shaft-sealing rings 112 on either side of the bearings 104, 105, in order to seal the respective rolling-contact-bearing chamber 113, through which the oil can flow. The sealing rings 112 may be designed as a shaft-sealing ring or as a lamellar sealing device or, for example, as a double-action seal and/or as a contact seal. Glide ring seals are within the scope of the present disclosure, if a high level of sealing is to be provided.

An optional guide ring 119 between the respective bearings 104, 105 and sealing devices may optimize the operation of the lubricant being directed away into the discharge channel or channels 118a, b.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A centrifuge comprising:
   a rotatable centrifugal drum;

a drive spindle to drive the centrifugal drum, which drive spindle is rotatably mounted via a bearing in a housing supported elastically on a machine framework;

a drive device including a drive motor to rotate the drive spindle;

a lubricant system to lubricate the bearing, the lubricant system configured to deliver lubricant from a lubricant-supply tank through a lubricant channel into a region of the bearing; and an injection device, arranged downstream of the lubricant-supply tank, is configured to deliver the lubricant into the region of the bearing by dispensing quantities of lubricant in temporally discrete pulses with a limited-time air stream, wherein the bearing includes a neck bearing and a foot bearing and the lubricant is delivered into a region of the neck bearing or into a region above the neck bearing, wherein the injection device has positioned downstream of it a lubricant-feed line by which the lubricant is delivered into the region of the neck bearing or into the region above the neck bearing, wherein the lubricant-feed line passes through a bore in the housing, and the lubricant flows out through the neck bearing and from there through a discharge channel into the foot bearing and then through another discharge channel in a belt pulley into a lubricant-intercepting tank.

2. The centrifuge as claimed in claim 1, wherein the drive device is configured to rotate the drive spindle via a drive belt.

3. The centrifuge as claimed in claim 1, wherein the region of the bearing is configured such that lubricant flows through the bearing, and that the lubricant is then directed away through a discharge line out of the region of the bearing and into the lubricant-intercepting tank.

4. The centrifuge as claimed in claim 3, wherein the drive spindle is configured such that a free end is not guided through the lubricant-intercepting tank.

5. The centrifuge as claimed in claim 1, wherein the injection device is an injection lubricator configured to meter out small quantities of lubricant.

6. The centrifuge as claimed in claim 5, wherein the injection lubricator is configured to dispense a quantity of lubricant for up to two seconds and the injection lubricator is set such that, between individual pulses, there is a pause of more than 60 seconds.

7. The centrifuge as claimed in claim 6, wherein the pause is between 60 and 180 seconds.

8. The centrifuge as claimed in claim 5, wherein the injection lubricator is configured to dispense a quantity of lubricant of between 5 mm$^3$ and 100 mm$^3$ every 60 seconds to 180 seconds.

9. The centrifuge as claimed in claim 8, wherein the quantity is between 10 mm$^3$ and 40 mm$^3$.

10. The centrifuge as claimed in claim 1, wherein one or both of the lubricant-supply tank and the lubricant-intercepting tank are integrated into the machine framework.

11. The centrifuge as claimed in claim 1, wherein one or both of the lubricant-supply tank and the lubricant-intercepting tank on the machine framework are configured as separate tanks.

12. The centrifuge as claimed in claim 1, wherein a region between the drive spindle and the housing is sealed.

* * * * *